Oct. 17, 1950
W. D. CANNON ET AL  
PREOILING AND PRESSURIZING OF  
ENGINE LUBRICATION SYSTEMS
2,526,197
Filed May 26, 1944
3 Sheets-Sheet 1
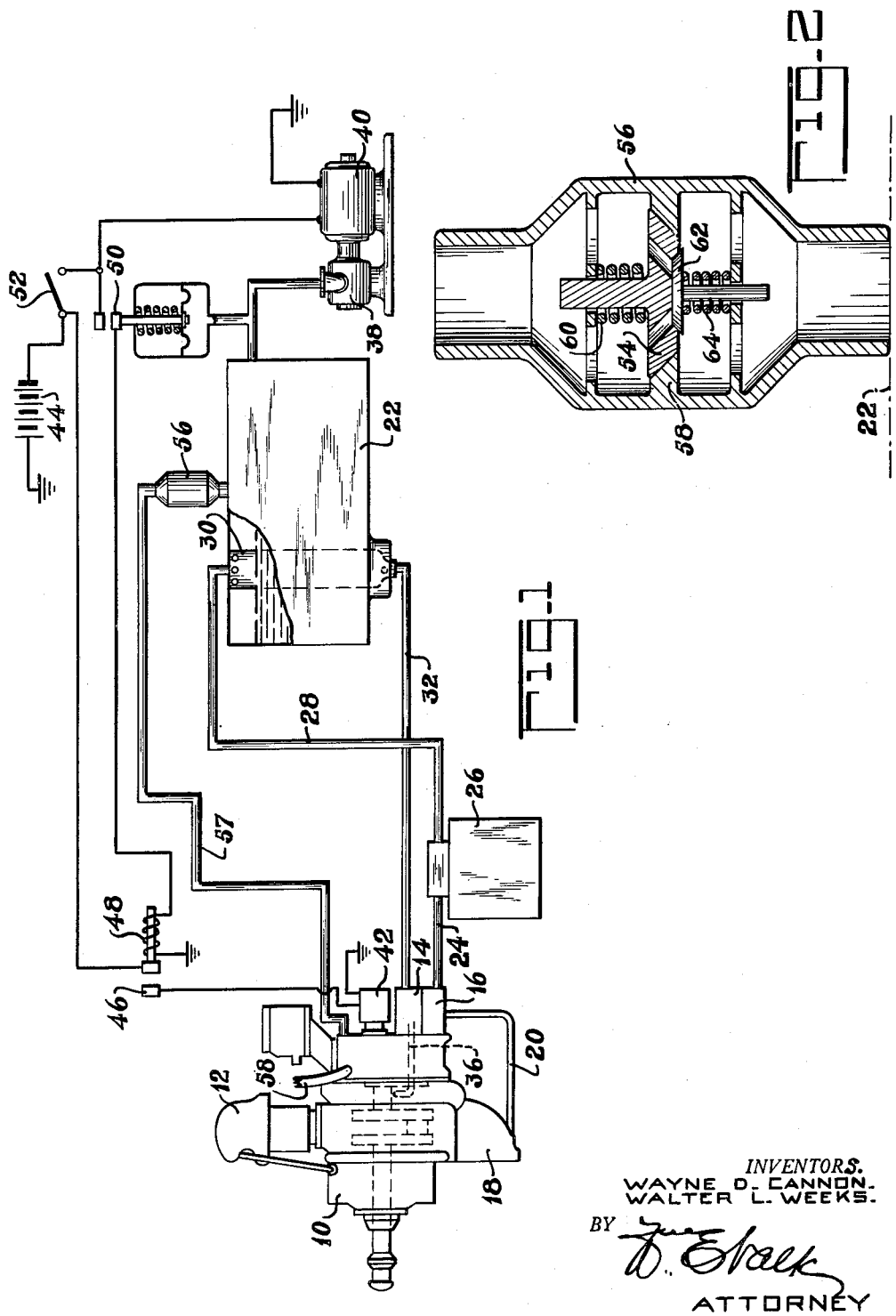
INVENTORS.  
WAYNE D. CANNON.  
WALTER L. WEEKS.  
BY  
ATTORNEY

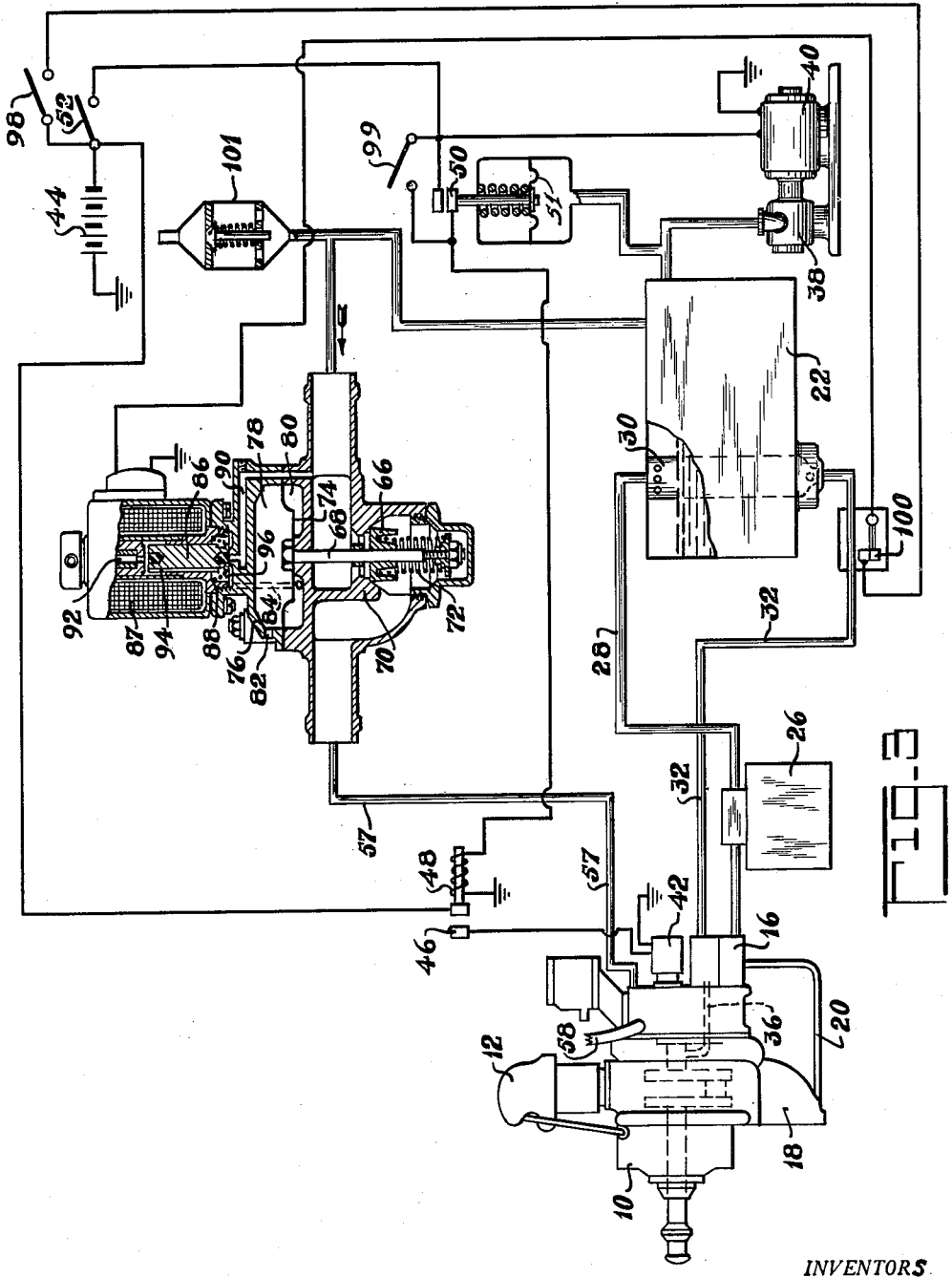

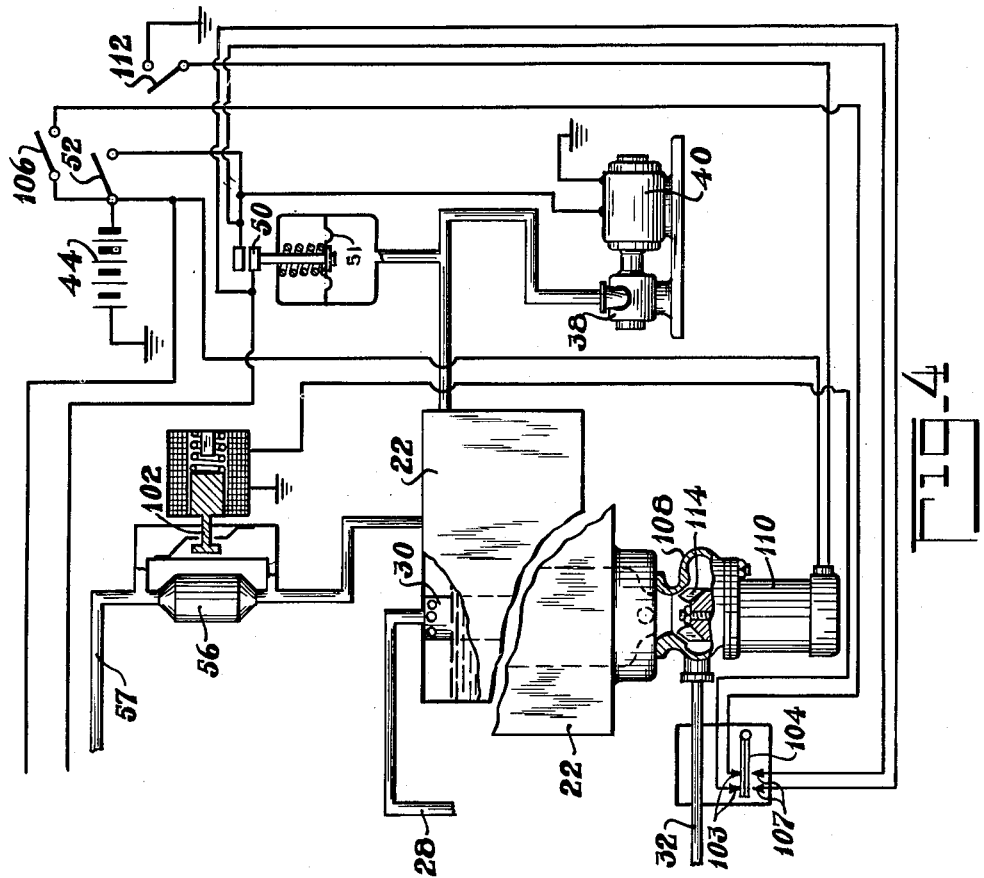

Patented Oct. 17, 1950

2,526,197

UNITED STATES PATENT OFFICE 2,526,197

PREOILING AND PRESSURIZING OF ENGINE LUBRICATION SYSTEMS

Wayne D. Cannon, Hohokus, and Walter L. Weeks, Wyckoff, N. J., assignors to Wright Aeronautical Corporation, a corporation of New York Application May 26, 1944, Serial No. 537,522

14 Claims. (Cl. 123—196)

This invention relates to engine lubrication systems and more particularly to means for pressurizing the oil supply tank of a so-called dry-sump lubrication system of an internal combustion engine.

Aircraft engines are generally provided with a dry-sump lubrication system in which the oil from the various bearing surfaces of the engine drains into a sump from which the oil is pumped into a remotely disposed oil tank or oil supply reservoir and an engine-driven oil pump is provided for drawing oil from the oil tank and pumping it to the various engine bearing surfaces to be lubricated. Difficulty has been experienced in such aircraft lubrication systems upon starting in cold weather as a result of the oil becoming quite viscous and thereby making it difficult for the engine lubricating pump to draw oil from the supply tank. This difficulty is particularly bad in an aircraft engine installation in which the oil tank is disposed at some distance from the engine. Accordingly, it is an object of this invention to provide means to assist the engine oil pump in drawing oil from the supply tank while the engine is being started and particularly while the oil is cold.

It is a further object of this invention to provide means for pressurizing the oil tank prior to starting of the engine in order to force the oil from the tank to the oil pump, thereby insuring a continual supply of oil at the pump inlet. With a pressurized oil tank, if the tank should become punctured, e. g., by a bullet, there is danger of losing considerable oil through the puncture in spite of the usual self-sealing characteristics of oil tanks. Accordingly, it is a further object of this invention to pressurize the oil tank to a relatively high pressure when the oil is cold, but after the oil heats up, the tank pressure is reduced to a lower value. It is a further object of this invention to provide an engine lubrication system in which the oil tank is only pressurized when the oil temperature is below a pre-determined value.

Other objects of this invention will become apparent upon reading the annexed detailed description of the drawing in which:

Figure 1 is a schematic view of an internal combustion engine dry-sump lubrication system embodying the invention;

Figure 2 is an enlarged, sectional view of the composite relief valve used in Figure 1;

Figure 3 is a diagrammatic view of a modified form of the invention; and

Figure 4 is a diagrammatic view of a third modification.

Referring to Figures 1 and 2 of the drawing, a conventional radial cylinder internal combustion engine illustrated at 10 having a bank of radially disposed cylinders 12 is provided with an engine driven oil pump 14 and an engine driven oil scavenge pump 16. Each of the pumps 14 and 16 is of the positive displacement type, e. g., a gear pump. The scavenge pump 16 is arranged to draw oil from an engine sump 18 through a line 20 and to pump the oil into an oil supply tank 22 by way of line 24, oil cooler 26 and line 28. The line 28 is arranged to discharge the oil into a warm-up hopper 30 disposed within the oil tank 22. A line 32 connects the inlet side of the pump 14 to the bottom of the oil tank 22 at a point adjacent the bottom of the warm-up hopper. The pump 14 delivers oil under pressure to the various bearing surfaces of the engine through passages such as 36. In lieu of the warm-up hopper 30, the oil from the cooler 26 may be returned directly to the bottom of the tank 22 adjacent the point of discharge of the oil from the tank during the warm-up period. The structure so far described is conventional.

With this conventional dry-sump lubrication system, in cold weather and while the aircraft is idle, the oil will become quite viscous, and under such condition there is danger that the pump 14 may be unable to draw oil from the tank 22 for engine lubrication when the engine is started. In order to avoid this difficulty, the oil tank 22 is pressurized before the engine is started by air pressure delivered by a small air pump 38, driven by an electric motor 40. In this way, even though the oil may become quite viscous, it will be forced under pressure through the discharge line 32, thereby insuring an adequate supply of oil to the inlet side of the pump 14.

The engine 10 is provided with a conventional electric starter 42 adapted to be connected to a battery 44 or other source of electric energy by the starter relay switch 46 of a starter relay 48. A pressure responsive switch contact 50 is carried by a flexible diaphragm 51 responsive to the pressure within the oil tank 22. The switch 50 is spring urged toward its open position and when the pressure within the oil tank 22 reaches a predetermined value, e. g., 6 pounds per square inch, the switch 50 closes, thereby connecting the starter relay 48 to the battery 44 through a starter switch 52. The electric motor 40 for driving the air pump 38 is connected directly to the battery 44 through the starter switch 52. With this arrangement, when the starter switch 52 is closed, the electric motor 40 is energized to drive the air pump 38, and when the pressure within the oil tank 22 reaches the predetermined value for which the pressure responsive switch 50 is set, the switch 50 operates to close a circuit for the starter relay 48. Thereupon the starter relay 48 closes the circuit to the starter motor through its switch 46 whereupon the engine is cranked.

During the cranking cycle the air pump 38 continues to pressureize the oil tank 22. However, when the cranking cycle is completed and the starter switch 52 is opened, the air pump motor 40 is then de-energized. In order to maintain the pressure within the oil tank, during and after the starting cycle has been completed, the tank 22 is vented through a pressure relief valve 54 which is spring urged toward its closed position in order to prevent the escape of the tank pressure until the tank pressure exceeds a predetermined value. As hereinafter described, this pressure relief valve 54 forms part of a composite relief valve assembly 56. In this way the air and oil vapors within the tank 22 are trapped therein until the pressure setting of the pressure relief valve is reached. Obviously, the pressure setting of the pressure relief valve 54 must at least be slightly higher than that of the pressure responsive switch 50. In the conventional dry-sump lubrication system, as well as in the present system, the oil scavenge pump has a larger capacity than the oil pressure pump, and therefore, considerable air is returned to the tank 22 by the scavenge pump 16. That is, during engine operation, the oil scavenge pump 16 is effective to pressurize tank 22 to the setting of the pressure relief valve 54.

The air and oil vapors escaping through the pressure relief valve 54 are returned to the crank case through a line 57. Also, the engine crank case is generally provided with a breather vent such as 58, in order to prevent the formation of excessive pressure therein. If desired, the pressure relief valve 54 may be disposed in the engine crank case breather 58 rather than in the line 57 between the oil tank 22 and the crank case. With the pressure relief valve disposed within the engine breather line 58, the engine crank case, as well as the tank 22, will be pressurized to the setting of the pressure relief valve 54. With the latter arrangement, the pressure maintained in the engine crank case by the pressure relief valve also aids the operation of the engine scavenge pump 16, but it is essential that the crank case be adequately sealed in order to prevent the leakage of oil therefrom, because of the pressure thereby maintained therein.

With the pressure relief valve 54 disposed either in line 57 or 58, it is essential to provide a second relief valve to permit air to enter the tank 22 and/or the crank case when the pressure therein drops below the surrounding atmosphere as a result of changes in temperature or altitude. A suitable composite relief valve 56 is illustrated in Figure 2. As illustrated, this combination valve comprises a pressure relief valve member 54 urged against a seat 58 by a spring 60 to prevent the escape of gases from the oil tank 22. Thus, the spring 60 determines the pressure maintained within the tank 22 by the pressure relief valve, and whenever the tank pressure begins to exceed this value, the pressure relief valve member 54 opens. The valve member 54 is also provided with a seat for a second relief valve member 62 which is urged thereagainst by a relatively light spring 64. With this construction, during normal operation the valve member 54 operates to maintain a pressure within the tank 22, but if the tank pressure should decrease below the pressure of the surrounding atmosphere, e. g., because of the drop in temperature causing condensation of the vapors within the tank, the relief valve member 62 opens to prevent the collapse of the tank walls.

In the above described lubrication system, the oil tank is pressurized under all operating conditions. In starting the engine when the oil is cold, this pressurization of the oil tank provides a continual supply of oil to the inlet of the engine oil pressure pump 14, thereby insuring adequate lubrication of the engine. Furthermore, since the pump 14 is a positive displacement type pump, its delivery pressure depends on the absolute magnitude of its inlet pressure. In fact, the delivery pressure of the pump falls off quite rapidly as the inlet pressure to the pump decreases below a predetermined value, depending on the particular pump. Accordingly, this minimum pump inlet pressure limits the maximum altitude at which the aircraft can operate with adequate engine lubrication. By maintaining a pressure within the tank under all operating conditions, the inlet pressure to the pump 14 is correspondingly raised, and therefore, the maximum altitude at which the pump will effect proper engine lubrication is also raised to an extent determined by the magnitude of the pressure maintained within the oil tank. However, for military purposes, there is some objection to the system as described, because if the oil tank should be pierced by a bullet, the pressure maintained within the tank might cause a loss of oil from the tank, in spite of the conventional self-sealing characteristics of such tanks. In order to minimize this objection, a modified system is illustrated in Figure 3, in which a lower oil tank pressure is maintained during normal engine operations.

The system illustrated in Figure 3 is identical to Figure 1 except for the pressure relief valve operation and construction. Accordingly, similar parts of Figures 1 and 3 have been designated by similar reference numbers. A pressure relief valve 66 is disposed in the line 57 for controlling the pressure within the oil tank 22. The pressure relief valve 66 is slidably supported on a valve stem 68 and is urged against the valve seat 70 by a spring 72 disposed between the valve 66 and one end of the valve stem. The valve stem is supported by a flexible diaphragm 74 dividing a housing 76 into upper and lower chambers 78 and 80 respectively. The upper chamber 78 is open to the atmosphere at 82 while the lower chamber 80 is in communication with a passageway 84, adapted to be connected either to the atmosphere or to the inlet side of valve 66.

A double ended solenoid valve 86 is provided with an operating winding 87 and is adapted to control the pressure within the chamber 80. When the winding 87 is de-energized, the solenoid valve 86 is urged by a spring 88 against a valve seat about a passage-way 90, communicating with the inlet side of the valve 66, as illustrated in Figure 3. In this position of the solenoid valve 86, the upper end of the valve uncovers a passage 92, open to the atmosphere, and as a result, atmospheric pressure is transmitted from the passage 92 down through a longitudinal groove 94 along the side of the valve 86 to a chamber 96 which is in communication with the passage 84. As a result of this construction, when the winding 87 is de-energized, the lower diaphragm chamber 80, as well as the upper chamber 78, is open to the atmosphere.

When the solenoid winding 87 is energized, the solenoid valve 86 is raised against its spring 88, thereby closing the atmospheric vent 92, and at the same time placing the chamber 96 in communication with the inlet side of the valve 66 through passage 90. Accordingly, when the solenoid winding 87 is energized, the lower diaphragm chamber 80 is connected to the inlet side of the valve 66, while the upper chamber is vented to the atmosphere, thereby subjecting the flexible diaphragm 74 to an upward differential pressure which is effective to further compress the spring 72. Therefore, when the solenoid winding 87 is energized, a larger fluid pressure against the inlet side of the pressure relief valve 66 is necessary to open this valve against the spring 72 as compared to when winding 87 is de-energized. For example, the pressure relief valve 66 may have a high pressure setting of 6 pounds per square inch and a lower pressure setting of 3 pounds per square inch, with the pressure responsive switch 50 set to close at a pressure slightly less than the high pressure setting of the pressure relief valve 66.

The solenoid winding 87 is connected in series with a manually operable switch 98 and a thermostatic switch 100, responsive to the temperature of the oil in the discharge line 32. When both switches 98 and 100 are closed, the solenoid winding 87 is energized to subject the diaphragm 76 to a differential fluid pressure, thereby further compressing the pressure relief valve spring 72 as previously described. Thermostatic switch 100 may be disposed so as to be responsive to the oil temperature at some other point in the system, and this switch is adapted to open when the oil temperature exceeds a predetermined value, e. g., 100° F.

If, when the engine starting is initiated, the engine oil temperature should be warm, that is, sufficient to open thermostatic switch 100, then upon closure of switch 98 the solenoid winding 87 would not be energized, thereby leaving the pressure relief valve 66 in its low pressure setting. In this situation, pump 38 could not increase the pressure in the tank 22 to the value necessary to close the pressure responsive switch 50 for energizing the starter relay 48. To meet this condition, a switch 99 is connected in parallel with switch 50, whereby in starting with warm engine oil, the switch 99 is closed for energizing the starter relay 48. The switch 99 may be manually controlled or it may be controlled by the thermal responsive element of switch 100, e. g., as illustrated in the modification of Figure 4. With either arrangement, if the engine oil is warm when the engine is started, the tank 22 is only pressurized to the low pressure setting of the pressure relief valve 66. However, this is not objectionable since obviously, when the engine oil is warm, it is no longer necessary to pressurize the engine oil tank in order to obtain adequate engine lubrication during the starting operation.

The operation of Figure 3 is as follows:

Upon starting the engine when cold, switches 98 and 52 are closed. If the oil temperature is below a predetermined value, the thermostatic switch 100 is also closed, and therefore, upon closure of switch 98, the solenoid winding 87 is energized and the pressure relief valve 66 is automatically set to open at a relatively high pressure within the oil tank 22. Closure of the starter switch 52 completes the circuit to the air pump motor 40, whereupon the air pump 38 operates to pressurize the oil tank 22. The pressure responsive switch 50 then closes to complete the circuit to the starter relay 48 through the starter switch 52, whereupon the relay switch 46 is closed to energize the starter motor 42. When the starting cycle is completed, the switch 52 is opened, thereby de-energizing the air pump motor 40, and thereafter the engine scavenge pump and the pressure relief 66 is effective to maintain the pressure within the tank 22.

When the oil temperature reaches a predetermined value, thermostatic switch 100 opens, thereby de-energizing the solenoid winding 87 and equalizing the pressure on the two sides of the diaphragm 74. Accordingly, check valve 66 is now set to open at a lower pressure. This low pressure is only of such magnitude as to insure efficient operation of engine oil pump 14 at whatever altitude it is required to operate. If the engine oil temperature is high enough to open thermostatic switch 100 when engine starting is initiated, then switch 99 is closed, thereby energizing the starter relay independently of pressure responsive switch 50. At the same time, because thermostatic switch 100 is open, the check valve 66 is adjusted to its low pressure setting.

In the system of Figure 3, as in Figure 1, it is necessary to provide a relief valve to admit air into the tank 22 in case the tank pressure drops below atmospheric pressure. Such a relief valve may be combined directly with the pressure relief valve 66 in a manner similar to the composite relief valve assembly 56 of Figure 1, or a separate relief valve may be provided as schematically indicated at 101 in Figure 3. Also, it should be noted that the pressure relief valve 66 may be disposed in the engine breather line 58 instead of in line 57 as discussed in connection with the valve assembly 56 of Figure 1.

In the system of Figure 1, under all engine operating conditions, the relief valve 54 only opens when the pressure within the oil tank 22 exceeds a predetermined high value, while in the system of Figure 3, the relief valve 66 opens at this high value only when the oil is cold and when the oil heats up, the relief valve opens at a relatively low tank pressure. In the case of a relatively large puncture of the oil tank 22, even this low pressure may be sufficient to cause considerable leakage of oil from the tank in spite of the self-sealing characteristics of the tank. In view of this objection, the modified system may be further modified as illustrated in Figure 4 in which tank 22 is only pressurized when the oil temperature is below a predetermined value.

The system of Figure 4 is generally similar to Figure 1, except a solenoid operated by-pass valve 102 is disposed in parallel with the composite relief valve 56. The winding of the solenoid operated by-pass valve is connected in series with thermostatic switch contacts 103 and a manually operable switch 106. The thermostatic switch contacts 103 are controlled by a thermostatic element 104 which like the thermostatic switch 100 of Figure 3, is disposed in heat exchange relation with the oil in the discharge line 32. With this arrangement, switches 52 and 106 are both closed in starting the engine. If the oil temperature in line 32 is below a predetermined value, then thermostatic switch contacts 103 are also closed, and closure of switch 106 is effective to close the solenoid valve 102, thereby closing the by-pass around the composite relief valve assembly 56. Closure of switch 52 starts the air pump 38 to pressurize the tank 22, and when the tank pressure reaches a predetermined value, pressure switch 50 closes to effect starting of the engine as in Figure 1. After the starting cycle has been completed and the starter switch 52 has been opened, the composite relief valve assembly 56 together with the engine scavenge pump is effective to maintain the tank pressure until the oil temperature in line 32 rises sufficiently to cause the thermostatic element 104 to open thermostatic switch contacts 103. This operation of thermostatic element 104 breaks the circuit to the solenoid by-pass valve 102, whereupon this valve opens to completely relieve the pressure within the tank 22.

Thermostatic element 104 is also adapted to close switch contacts 107 as soon as switch contacts 103 open upon increase of the oil temperature. The contacts 107 are connected in parallel with the pressure responsive switch 50 and therefore serve a purpose similar to that of switch 99 of Figure 3, namely, to energize the engine starting relay in starting the engine when the oil temperature is high enough to open switch contacts 103.

With the system of Figure 4, since the engine oil quickly heats up in response to engine operation, the oil tank is only pressurized during engine starting and for a short time thereafter. Accordingly, during normal engine operation, no pressure is maintained within the oil tank, and therefore, there is little or no danger of loss of oil from the tank if the tank should become punctured, e. g., by a bullet. However, since no pressure is maintained within the oil tank during normal engine operation, the delivery pressure of the pump 14 will fall off at a lower maximum altitude as compared to the systems of Figures 1 and 3 in which the oil tanks are continuously pressurized. However, by adding a booster pump 108 at the discharge outlet of the tank 22, it is possible to increase the inlet pressure to the pump 14 without continuously pressurizing the tank 22. The booster pump 108, when operated, increases the inlet pressure to the pump 14, thereby raising the maximum altitude at which the pump 14 can still provide adequate oil pressure.

The pump 108 is illustrated as driven by an electric motor 110 which is controlled by a switch 112. With this arrangement, the pump 108 may be used whenever desired, e. g., at high altitudes in order to boost the inlet pressure to the pump 14. The pump 108 should be of a type which offers very little resistance to oil flow therethrough when it is not operated, or it should be provided with low resistance by-pass valves. Such pump designs are well known, and as illustrated, the pump 108 comprises vaned rotor 114, which, when not operating, offers very little resistance to oil flow therethrough. Such a pump is quite inefficient when the oil temperature is low, and therefore, should only be operated when the oil is at its normal engine operating temperature. By means of manual switch 112, the operator can use the booster pump 108 whenever warranted by the operating conditions. Obviously, the pump 108 could also be controlled automatically by altitude and/or oil temperature responsive means. Although the booster pump 108 offers only small resistance to the oil flow therethrough when the pump is idle, even this small added resistance in the absence of pressurization of the oil tank makes it even more difficult to obtain adequate engine lubrication in starting with cold oil, and therefore, this added resistance introduced by the booster pump might be prohibitive in the absence of pressurization of the oil tank.

Although the solenoid operated by-pass valve 102 and the booster pump 108 have been illustrated and described as modifying the system of Figure 1, it should be obvious that either or both of these features could also be used in connection with the system of Figure 3.

In all the systems disclosed of the present invention, a continual flow of oil to the inlet side of the engine oil pressure pump is assured, even though the oil is quite cold and the oil tank is disposed at some distance from the oil pressure pump. Also, by pressurizing the oil tank and/or by providing a booster pump at the outlet of the oil tank, the inlet pressure to the pump 14 is raised, thereby correspondingly raising the maximum altitude at which pump 14 will still deliver adequate oil pressure.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications and changes.

We claim as our invention:

1. In combination with an engine, an oil supply reservoir, an engine driven oil pump adapted to draw oil from said reservoir for lubricating said engine, an engine driven pump for returning oil from said engine to said reservoir, means operable to impose an above-atmospheric gas pressure on the surface of the oil in said reservoir before the engine is started, a pressure relief valve adapted to open to relieve excessive pressure within said reservoir, means providing a by-pass passage around said relief valve, and a valve for controlling said passage.

2. In combination with an engine, an oil supply reservoir, an engine driven oil pump adapted to draw oil from said reservoir for lubricating said engine, an engine driven pump for returning oil from said engine to said reservoir, means operable to impose an above-atmospheric gas pressure on the surface of the oil in said reservoir before the engine is started, a pressure relief valve adapted to open to relieve excessive pressure within said reservoir, means providing a by-pass passage around said relief valve, a valve for controlling said by-pass passage, and means responsive to the temperature of the oil for effecting operation of said by-pass valve to open said by-pass passage when said oil temperature exceeds a predetermined value.

3. In combination with an engine, an oil supply reservoir, an engine driven oil pump adapted to draw oil from said reservoir for lubrication of said engine, means operative to impose an above-atmospheric gas pressure on the surface of the oil within said supply reservoir before starting said engine, means operative to maintain a pressure on the oil within said supply reservoir when said engine is operating, an oil temperature responsive element, and means operatively associated with said element for rendering said pressure maintaining means ineffective to maintain any pressure within said reservoir when said oil temperature exceeds a predetermined value.

4. In combination with an engine, an oil supply reservoir, an engine driven oil pump adapted to draw oil from said reservoir for lubricating said engine, means operative to pressurize said reservoir before the engine is started, means capable of maintaining pressurization of said reservoir during engine operation, means operable to render said pressure maintaining means ineffective, and booster pump means disposed in the oil flow path from said reservoir to said first mentioned pump, said booster pump means being of a type providing very little resistance to oil flow therethrough when not operating, and means for rendering said pressure maintaining means ineffective to maintain any pressure within said reservoir when said oil temperature exceeds a predetermined value.

5. In combination with an engine, a lubrication system therefore comprising an oil supply reservoir, an engine driven oil pump adapted to draw oil from said reservoir for lubrication of said engine, an engine driven pump for returning oil from said engine to said reservoir, a pressure relief valve for said reservoir adapted to open when the gas pressure within said reservoir exceeds a predetermined value, a pump operative to impose a gas pressure on the oil within said reservoir before the engine is started, means movable in response to changes in pressure within said reservoir, and means controlled by said movable means and adapted to prevent starting said engine until said pressure exceeds a predetermined value.

6. In combination with an engine, a reservoir for engine lubricating oil, an engine driven pump adapted to draw oil from said reservoir for lubricating said engine, pump means operable to impose a gas pressure on the oil within said reservoir, means responsive to the pressure within said reservoir and operable when said pressure exceeds a predetermined value, and means controlled by said responsive means and adapted to prevent starting said engine until said pressure exceeds a predetermined value.

7. In combination with an engine, a reservoir for engine lubricating oil, an engine driven pump adapted to draw oil from said reservoir for lubricating said engine, a starter motor for said engine, means operable to control the operation of said starter motor, pump means operable to impose an above-atmospheric gas pressure on the oil within said reservoir, and means responsive to the gas pressure within said reservoir, said responsive means including means movable to control the operation of said starter motor control means so that said starter motor is not operated until said gas pressure exceeds a predetermined value.

8. In combination with an engine, a reservoir for engine lubricating oil, an engine driven pump adapted to draw oil from said reservoir for lubricating said engine, a starter motor for said engine, pump means operable to impose an above-atmospheric gas pressure on the oil within said reservoir, manual means operable to initiate operation of said pump means, means movable with changes in gas pressure within said reservoir and operatively associated with said manual means such that said starter motor is automatically rendered operative only after operation of said manual means and after the gas pressure within said reservoir exceeds a predetermined value.

9. In combination with an engine; a lubrication system for said engine comprising an oil supply reservoir; means operative to provide an above-atmospheric pressure on the surface of the oil within said reservoir before starting said engine; means movable in response to changes in pressure within said reservoir; and means controlled by said movable means and adapted to prevent starting said engine until said pressure exceeds a predetermined value.

10. In combination with an engine; a lubrication system for said engine comprising an oil supply reservoir; means operative to provide an above atmospheric pressure on the surface of the oil within said reservoir before starting said engine; means movable in response to changes in pressure within said reservoir; means controlled by said movable means and adapted to prevent starting said engine until said pressure exceeds a predetermined value; and means adapted to provide an above-atmospheric pressure on the surface of the oil within said reservoir when said engine is operating.

11. In combination with an engine; a lubrication system for said engine comprising an oil supply reservoir; an engine driven oil pump adapted to draw oil from said reservoir for lubrication of said engine; means operative to impose an above-atmospheric gas pressure on the surface of the oil within said supply reservoir before starting said engine in order to insure a supply of oil at the inlet of said oil pump when said engine is started; means movable in response to changes in pressure within said reservoir; and means controlled by said movable means and adapted to prevent starting said engine until said pressure exceeds a predetermined value.

12. In combination with an engine; a reservoir for engine lubricating oil; means operable to impose an above-atmospheric gas pressure on the surface of the oil within said reservoir; a starter motor for said engine; means operable to control the operation of said starter motor; and means responsive to the gas pressure within said reservoir, said responsive means including means movable to control the operation of said starter motor control means so as to prevent operation of said starter motor until said gas pressure exceeds a predetermined value.

13. In combination with an engine; an oil supply reservoir; an engine driven pump adapted to draw oil from said reservoir for lubricating said engine; an engine driven pump of larger capacity than said first-mentioned pump for returning oil to said reservoir from said engine; a pressure relief valve for said reservoir; means for modifying the action of said relief valve so as to vary the pressure at which said valve opens; and means responsive to oil temperature for controlling said relief valve modifying means such that said relief valve opens at a lower pressure when said temperature exceeds a predetermined value.

14. In combination with an engine; an oil supply reservoir; an engine driven pump adapted to draw oil from said reservoir for lubricating said engine; means operative to impose an above-atmospheric gas pressure on the surface of the oil within said supply reservoir; a pressure relief valve for said reservoir; means for modifying the action of said relief valve so as to vary the pressure at which said valve opens; and means responsive to oil temperature for controlling said relief valve modifying means such that said relief valve opens at a lower pressure when said temperature exceeds a predetermined value.

WAYNE D. CANNON.
WALTER L. WEEKS.

(References on following page)

REFERENCES CITED

The following references are of record in the file of this patent:

UNITED STATES PATENTS

| Number | Name | Date |
|---|---|---|
| 2,000,714 | Nutt | May 7, 1935 |
| 2,001,858 | Watson | May 21, 1935 |
| 2,021,282 | Blanchard | Nov. 19, 1935 |
| 2,033,992 | Moller | Mar. 17, 1936 |
| 2,102,514 | Clarkson | Dec. 14, 1937 |

FOREIGN PATENTS

| Number | Country | Date |
|---|---|---|
| 145,273 | Great Britain | July 2, 1920 |
| 676,043 | Germany | May 24, 1939 |